(12) United States Patent
Cowan et al.

(10) Patent No.: US 7,451,249 B2
(45) Date of Patent: Nov. 11, 2008

(54) METHOD AND APPARATUS FOR DIRECT INPUT AND OUTPUT IN A VIRTUAL MACHINE ENVIRONMENT CONTAINING A GUEST OPERATING SYSTEM

(75) Inventors: Joe P. Cowan, Ft. Collins, CO (US); Matthew B. Lovell, Ft. Collins, CO (US); Leith L. Johnson, Ft. Collins, CO (US); Jonathan K. Ross, Bellevue, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 294 days.

(21) Appl. No.: 11/378,852

(22) Filed: Mar. 16, 2006

(65) Prior Publication Data

US 2006/0271752 A1    Nov. 30, 2006

Related U.S. Application Data

(60) Provisional application No. 60/664,219, filed on Mar. 21, 2005.

(51) Int. Cl.
*G06F 13/00* (2006.01)
*G06F 12/14* (2006.01)

(52) U.S. Cl. .................. 710/22; 710/28; 710/33; 710/36; 375/506; 711/163

(58) Field of Classification Search .............. 710/22, 710/28, 33, 36; 345/506; 711/163
See application file for complete search history.

(56) References Cited

U.S. PATENT DOCUMENTS

| 6,519,645 | B2 * | 2/2003 | Markos et al. ............ 709/228 |
| 2002/0138701 | A1 | 9/2002 | Suzuoki et al. |
| 2005/0076186 | A1 * | 4/2005 | Traut ........................ 712/1 |
| 2006/0146057 | A1 * | 7/2006 | Blythe ..................... 345/506 |

FOREIGN PATENT DOCUMENTS

EP      1 271 327 A2    1/2003

OTHER PUBLICATIONS

IBM Technical Disclosure Bulletin, vol. 33, No. 11, pp. 398-399 (Apr. 1, 1991).
EP Search Report from counterpart EP 06 11 1395.

* cited by examiner

*Primary Examiner*—Tammara Peyton

(57) ABSTRACT

Method and apparatus for allowing a direct memory access unit to have access to a virtual address space is accomplished by receiving a request for memory access from the direct memory access device; determining a device identifier according to the received request for memory access; determining a memory protection schema according to the determined device identifier; and granting the direct memory access unit access to memory in accordance with the determined memory protection schema.

39 Claims, 17 Drawing Sheets

METHOD AND APPARATUS FOR DIRECT INPUT AND OUTPUT IN A VIRTUAL MACHINE ENVIRONMENT CONTAINING A GUEST OPERATING SYSTEM

RELATED APPLICATIONS

The present application claims priority to U.S. Provisional Application Ser. No. 60/664,219 entitled "Method and Apparatus for Direct Input and Output in a Virtual Machine Environment" by Cowan et al., which was filed on Mar. 21, 2005.

BACKGROUND

Today, computer systems often support multiple operating systems within a single machine environment. Typically, a machine environment is controlled by a main operating system. The main operating system creates one or more virtual machine environments, which are all subordinate to the environment maintained by the main operating system. Within a particular virtual machine environment, a guest operating system is able to operate and spawn individual user tasks. From the perspective of any individual user task, the guest operating system appears to be the only and omnipotent controlling factor within the virtual machine environment. In fact, an individual user task executing in a virtual machine environment typically cannot even tell that it is not operating in a stand-alone computing environment. For all intents and purposes, a virtual machine environment appears no different than a dedicated computing environment, at least from the perspective of a user task. In most instances, a virtual machine environment provided for a guest operating system is essentially transparent to the guest operating system. As such, a guest operating system executing in a virtual machine environment, in most cases, also cannot tell that it is not executing in a dedicated computing environment.

In order to provide this level of transparency, the main operating system which establishes a virtual machine environment installs the proper services such that the guest operating system cannot tell that it is executing in a virtual environment. Typically, this means that a guest operating system really interacts with services provided by the main operating system. Accordingly, the guest operating system does not have direct access to any peripherals attached to a real computing environment within which the virtual machine environment exists.

By establishing services for interacting with input and output devices, a main operating system must, by definition, interact with the input and output devices and must preclude such interaction by any other executing process, even if that executing process is a guest operating system executing in a virtual machine environment. As a result, the guest operating system only thinks that it is controlling the input or output device. In reality, the guest operating system is employing the services provided by the main operating system. This results in a devastating impact to the performance offered by the main computing environment which is hosting one or more virtual machine environments.

One common form of input or output interaction performed by the main operating system is that of controlling a direct memory access device. A direct memory access unit is typically responsible for moving information from the input device to a system memory or from the system memory to an output device. In order to provide transparent services to a guest operating system, the main operating system must directly control the direct memory access device. This control typically includes managing input and output buffers in a memory and directing a direct memory access unit to use a pre-established buffer. All this interaction is accomplished in accordance with a particular memory access protection schema, which is typically managed by the main operating system. A subordinate memory access protection schema may actually exist in a virtual machine environment, but that memory protection scheme typically does not deal with physical devices such as input and output peripherals attached to the real computing environment managed by the main operating system.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
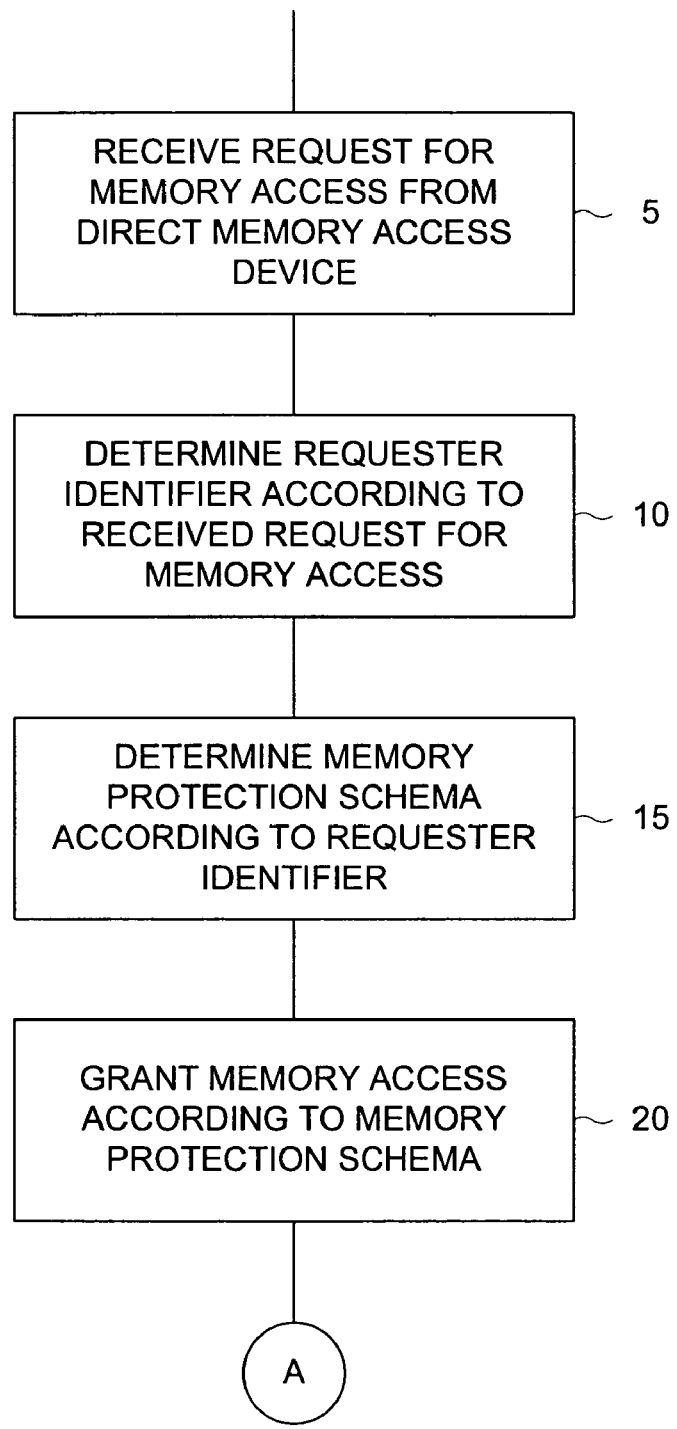
FIG. 1 is a flow diagram that depicts one example method for all allowing a direct memory access unit to access a virtual address space.

FIG. 1 is a flow diagram that depicts one example method for all allowing a direct memory access unit to access a virtual address space. According to this example method, a direct memory access unit is allowed access to a virtual address space by a host system by first receiving a request for memory access from the direct memory access unit (step 5). In order to allow access, the present method provides for determining a requester identifier (step 10) for the direct memory access unit requesting access to a memory included in the virtual address space. It should be appreciated that a direct memory access unit comprises any physical or functional device attached to a peripheral bus that has the capability of directly accessing a memory resource. As such, this term is not to be confused with a direct memory access controller, which comprises a device that controls the flow of data from a peripheral unit to a memory, usually by providing a memory address and by coordinating a transfer of data into the memory at the provided address.

According to one variation of the present method, the requester identifier is determined according to a request for memory access received from the direct memory access unit. It should be appreciated that, according to one variation of the present method, a particular direct memory access unit in fact may be controlled by more than just a main operating system controlling a real computing environment. For example, according to one illustrative use case, a direct memory access unit is controlled by a guest operating system. In this situation, a memory protection schema is typically determined according to the requester identifier (step 15). The determined memory protection schema is typically associated with a particular virtual address space. Once a memory protection schema is determined, the direct memory access unit is granted access to the memory in accordance with the memory protection scheme (step 20).

Figure 2:
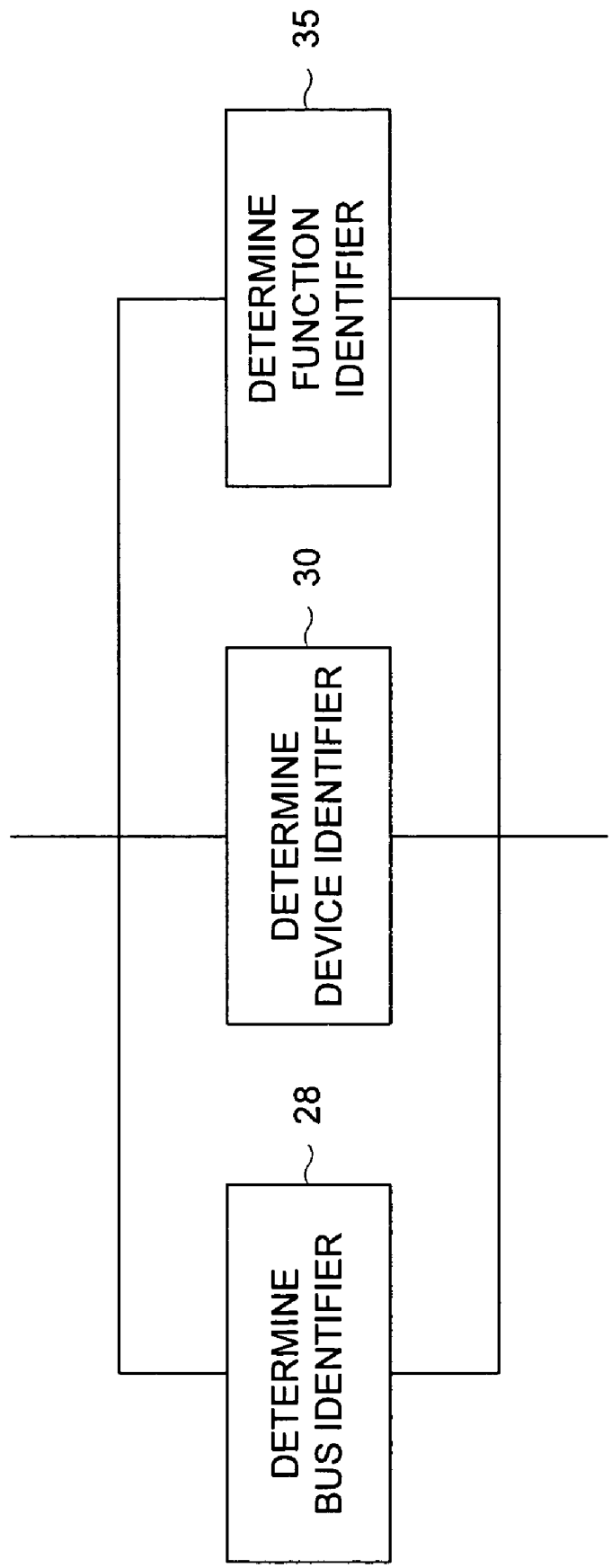
FIG. 2 is a flow diagram that depicts alternative example methods for determining a device identifier.

FIG. 2 is a flow diagram that depicts alternative example methods for determining a requester identifier. According to one alternative example method, a requester identifier for a direct memory access unit is determined by determining a bus identifier (step 28). Typically, a bus identifier includes an identifier associated with a particular peripheral bus to which the requester is physically attached. According to yet another example alternative method, determining a requester identifier for a direct memory access unit requesting access to a memory is accomplished by determining a device identifier. A device identifier identifies a physical device attached to a particular peripheral bus. According to yet another alternative example variation of the present method, determining a requester identifier for a direct memory access unit comprises determining a function identifier (step 35). A function identifier typically indicates a particular function included in a physical device attached to a particular peripheral bus. These variations of the present method for determining a particular requester identifier are presented herein solely to illustrate various alternative methods for determining a requester identifier and are not intended to limit the scope of the claims appended hereto.

Figure 3:
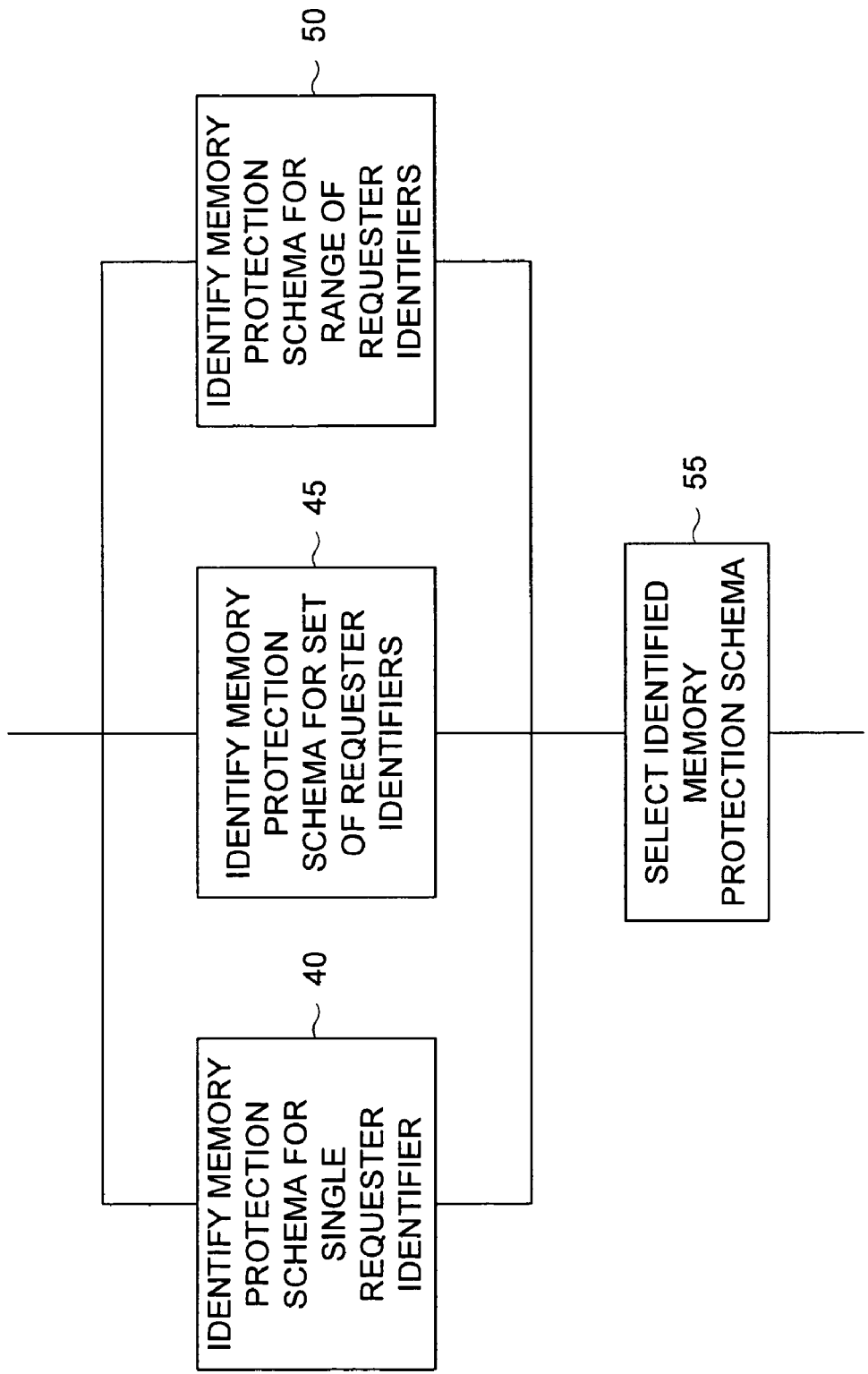
FIG. 3 is a flow diagram that depicts several alternative example methods for determining a memory protection schema.

FIG. 3 is a flow diagram that depicts several alternative example methods for determining a memory protection schema. Accordingly, one example variation of the present method provides for identifying a memory protection schema based on a single requester identifier (step 40). It should be appreciated that the single requester identifier, as heretofore described in alternative variations of the present method, includes, but is not limited to at least one of a bus identifier, a device identifier and a function identifier. It should be appreciated that a particular memory protection schema, which is typically associated with a virtual address space, may be used by several different direct memory access units. In this situation, one variation of the present method provides for identifying a memory protection schema for a set of requester identifiers (step 45). According to yet another example variation of the present method, a memory protection schema is identified based on a range of requester identifiers (step 50). In any of these example variations of the present method, a memory protection schema is then selected according to the identified memory protection schema (step 55). According to one alternative example method, a requester identifier includes, but is not limited to a bus identifier, a device identifier and a function identifier.

Figure 4:
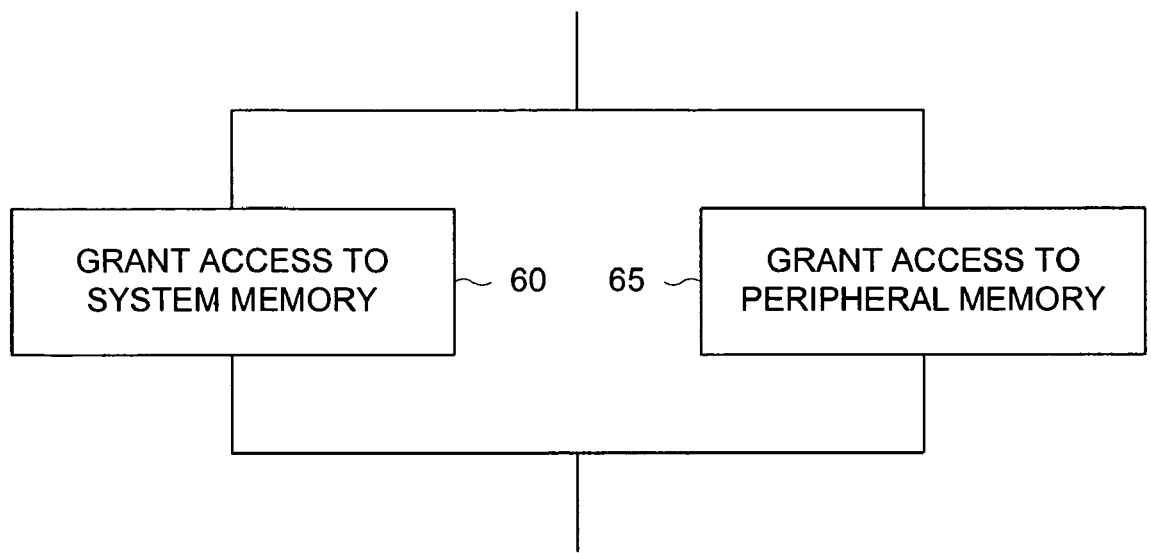
FIG. 4 is a flow diagram that depicts alternative example methods for granting access to a memory.

FIG. 4 is a flow diagram that depicts alternative example methods for granting access to a memory. Once a memory protection schema is determined according to a determined requester identifier, a direct memory access unit that has requested access to a memory is granted access to the memory. It should also be appreciated that, according to one illustrative use case, a direct memory access unit may request access either to a system memory or to a peripheral memory. A peripheral memory, according to one illustrative use case, includes but is not limited to a memory included in a second direct memory access device. Accordingly, one illustrative variation of the present method provides for granting a requesting direct memory access unit access to a system memory (step 60). According to yet another example variation of the present method, granting access to a memory comprises granting a direct memory access unit access to a peripheral memory (step 65).

Figure 5:
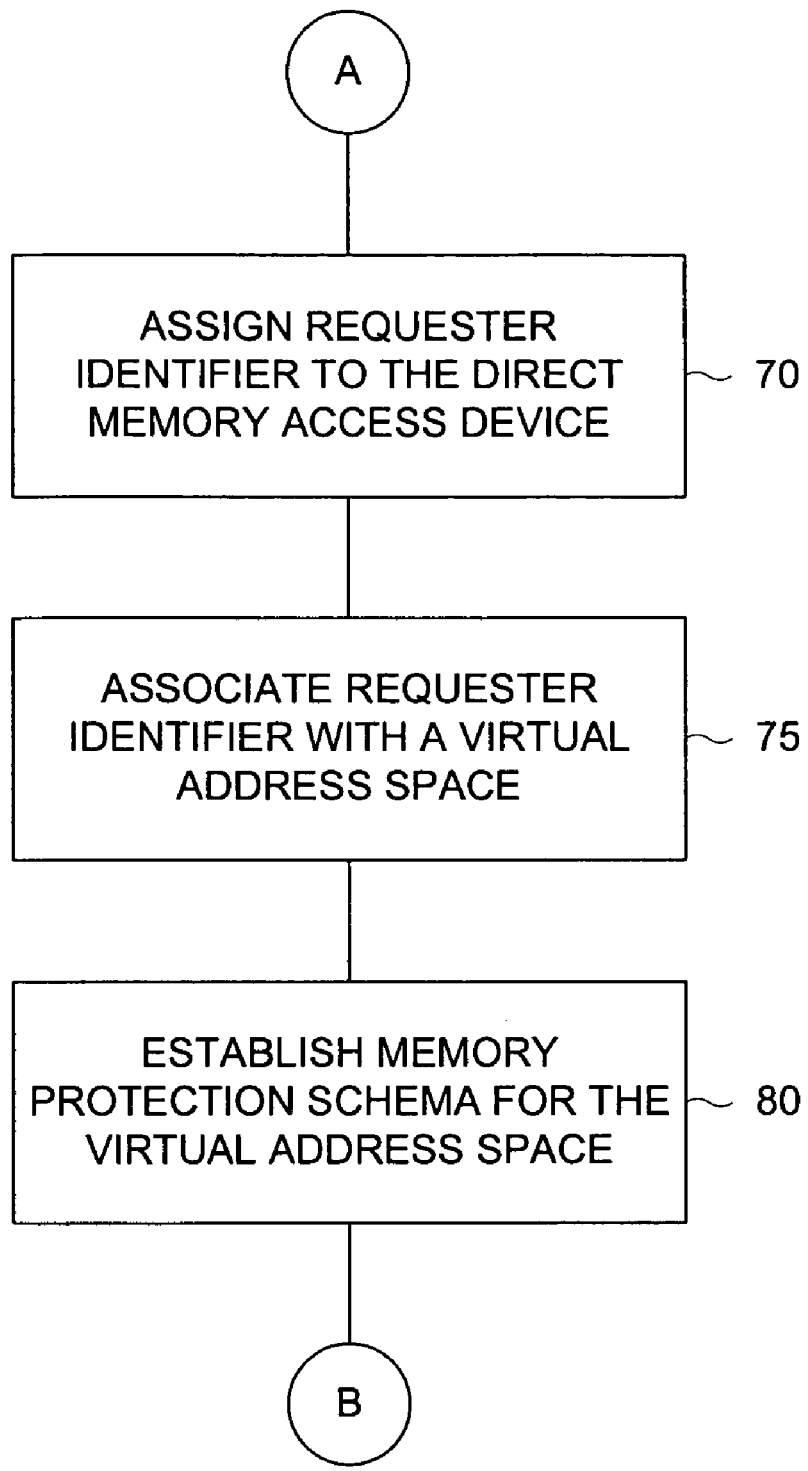
FIG. 5 is a flow diagram that depicts one alternative example method for allowing a direct memory access unit to access a virtual address space.

FIG. 5 is a flow diagram that depicts alternative example method for allowing a direct memory access unit to access a virtual address space. It should be appreciated that, in order to determine a memory protection schema, a direct memory access unit provides a requester identifier, which is that used as a basis for selecting a particular memory protection schema. According to at least one illustrative use case, a direct memory access unit is embodied as a Peripheral Component Interconnect (PCI) compatible device. In yet another illustrative use case, a direct memory access unit is embodied as a Peripheral Component Interconnect express (PCIe) compatible device. According to these example illustrative use cases, a device attached to a peripheral component interconnect peripheral bus is typically recognized by a host system. According to the present method, a requester identifier is assigned to a direct memory access unit (step 70) that is recognized by the system when it is attached to a peripheral bus. It should be appreciated that, according to the present method, any type of peripheral bus can be supported. Accordingly, the illustrative use cases presented herein are not intended to limit the scope of the claims appended hereto.

Once a requester identifier is assigned to a direct memory access unit, a virtual address space is then associated with the requester identifier (step 75). In this manner, a virtual address space, which is typically managed by a guest operating system, is associated with a direct memory access unit. Accordingly, a direct memory access unit is allowed to access the virtual address space once a protection schema for the virtual address space is established (step 80). Again, it should be appreciated that, according to one variation of the present method, more than one direct memory access units are allowed access to a particular virtual address space. For example, identification of the memory protection schema, according to one illustrative variation of the present method, is accomplished according to at least one of a single requester identifier, a set of requester identifiers and a range of requester identifiers as heretofore described.

Figure 6:
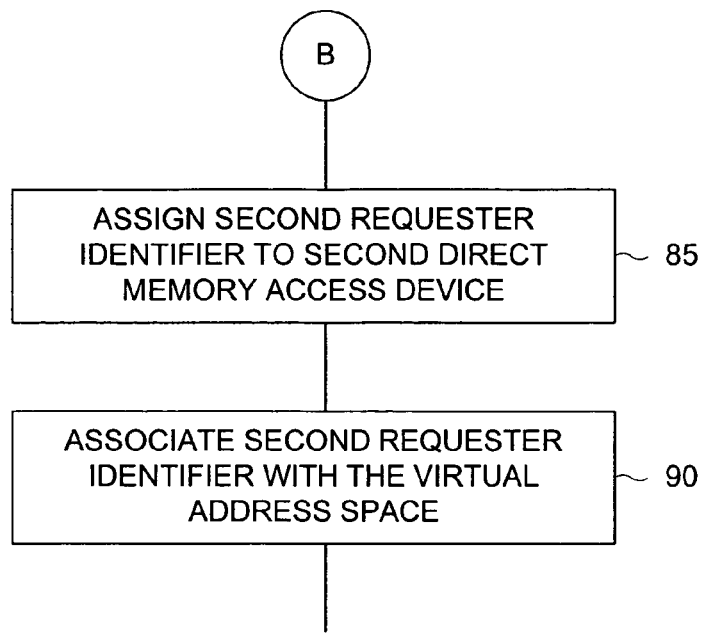
FIG. 6 is a flow diagram that depicts one alternative method for allowing a second direct memory access unit access to a virtual address space.

FIG. 6 is a flow diagram that depicts one alternative method for allowing a second direct memory access unit access to a virtual address space. As just described, a plurality of direct memory access units, according to one illustrative use case, is allowed access to a particular virtual address space. According to one illustrative variation of the present method, a second requester identifier is assigned to a second direct memory access unit (step 85) once a first direct memory access unit is configured according to the method presented herein. The second requester identifier is then associated with the virtual address space (step 90) which has previously been associated with a first requester identifier. According to this illustrative variation of the present method, at least two direct memory access units are associated with a single virtual address space.

Figure 7:
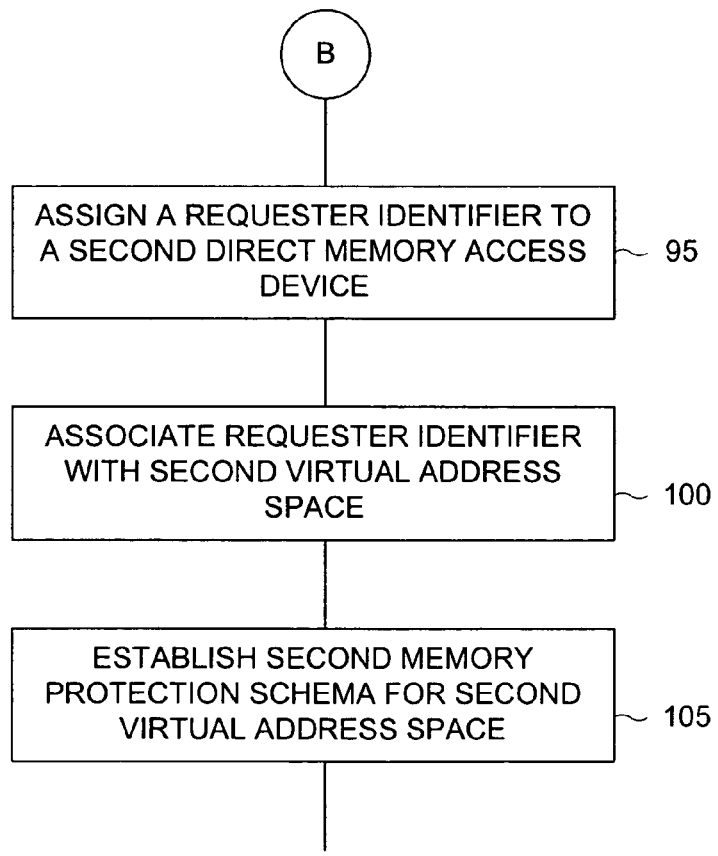
FIG. 7 is a flow diagram that depicts an alternative example method for enabling access to a second virtual address space by a second direct memory access device.

FIG. 7 is a flow diagram that depicts an alternative example method for enabling access to a second virtual address space by a second direct memory access device. It should be appreciated that, according to one illustrative use case, more than one virtual address space is provided within a real machine environment. Accordingly, one example variation of the present method provides for assigning a requester identifier to a second direct memory access unit (step 95). A second virtual address space is then associated with the requester identifier assigned to the second direct memory access unit (step 100). A memory protection schema is then established for the second virtual address space (step 105). It should be appreciated that a second direct memory access device, according to one illustrative use case, is managed by a second guest operating system which is executing in a second virtual environment. As such, the second virtual environment has a second virtual address space associated therewith. This example variation of the present method provides for enablement of a plurality of direct memory access units to access different virtual address spaces which may be associated with different virtual environments managed and maintained by a main operating system that is in control of a real computing environment.

Figure 8:
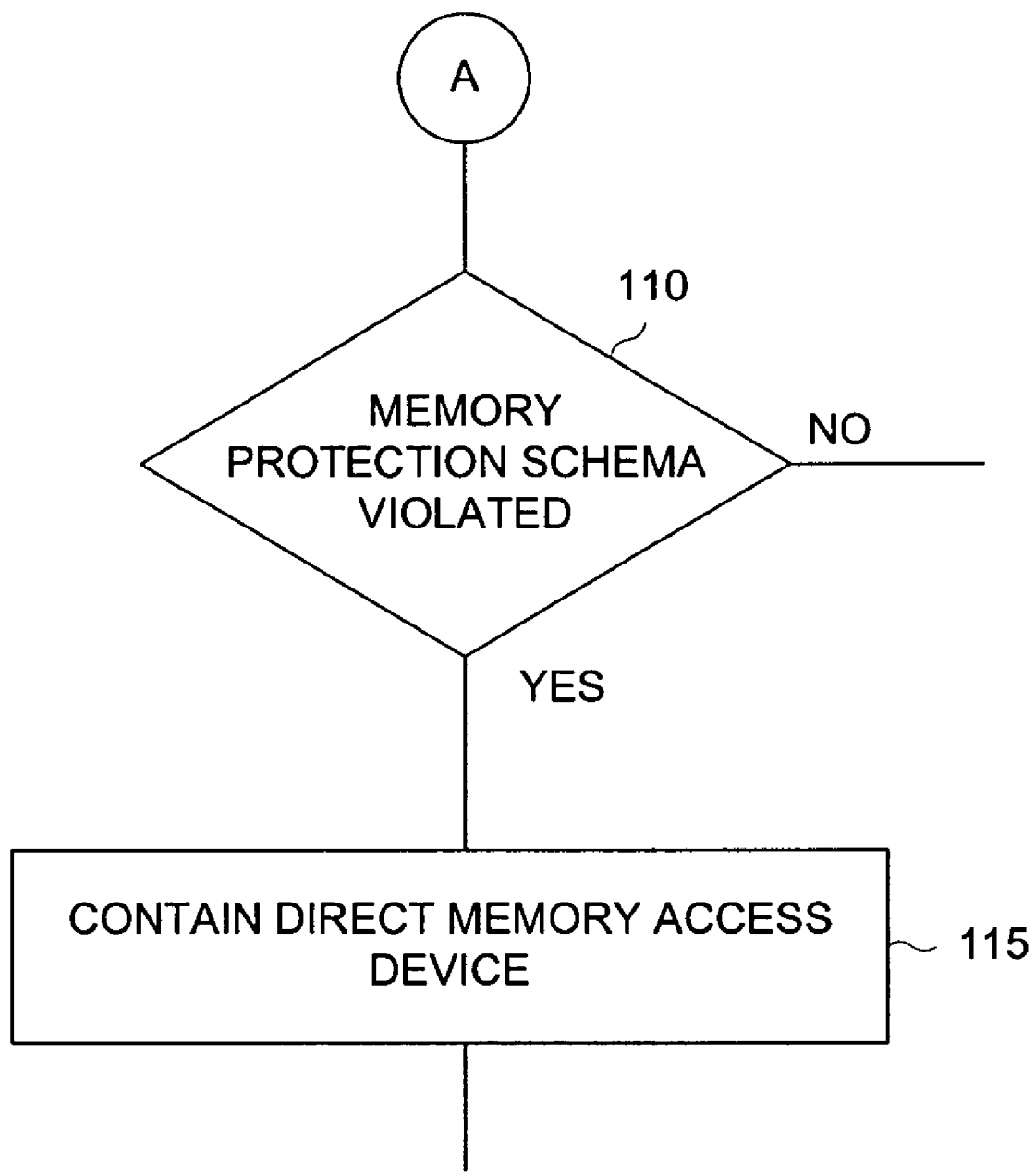
FIG. 8 is a flow diagram that depicts one alternative example method for allowing a direct memory access unit to access a virtual address space.

FIG. 8 is a flow diagram that depicts one alternative example method for allowing a direct memory access unit to access a virtual address space. It should be appreciated that, according to this variation of the present method, there must be some form of response when a memory protection schema has been violated. Hence, once access is granted to a direct memory access unit in accordance with a memory protection schema, this example variation of the method provides for containing an offending requesting unit in response to an unauthorized attempt to access a virtual address space. According to this alternative example method, a direct memory access unit is contained (step 115) when a memory protection schema has been violated (step 110).

Figure 9:
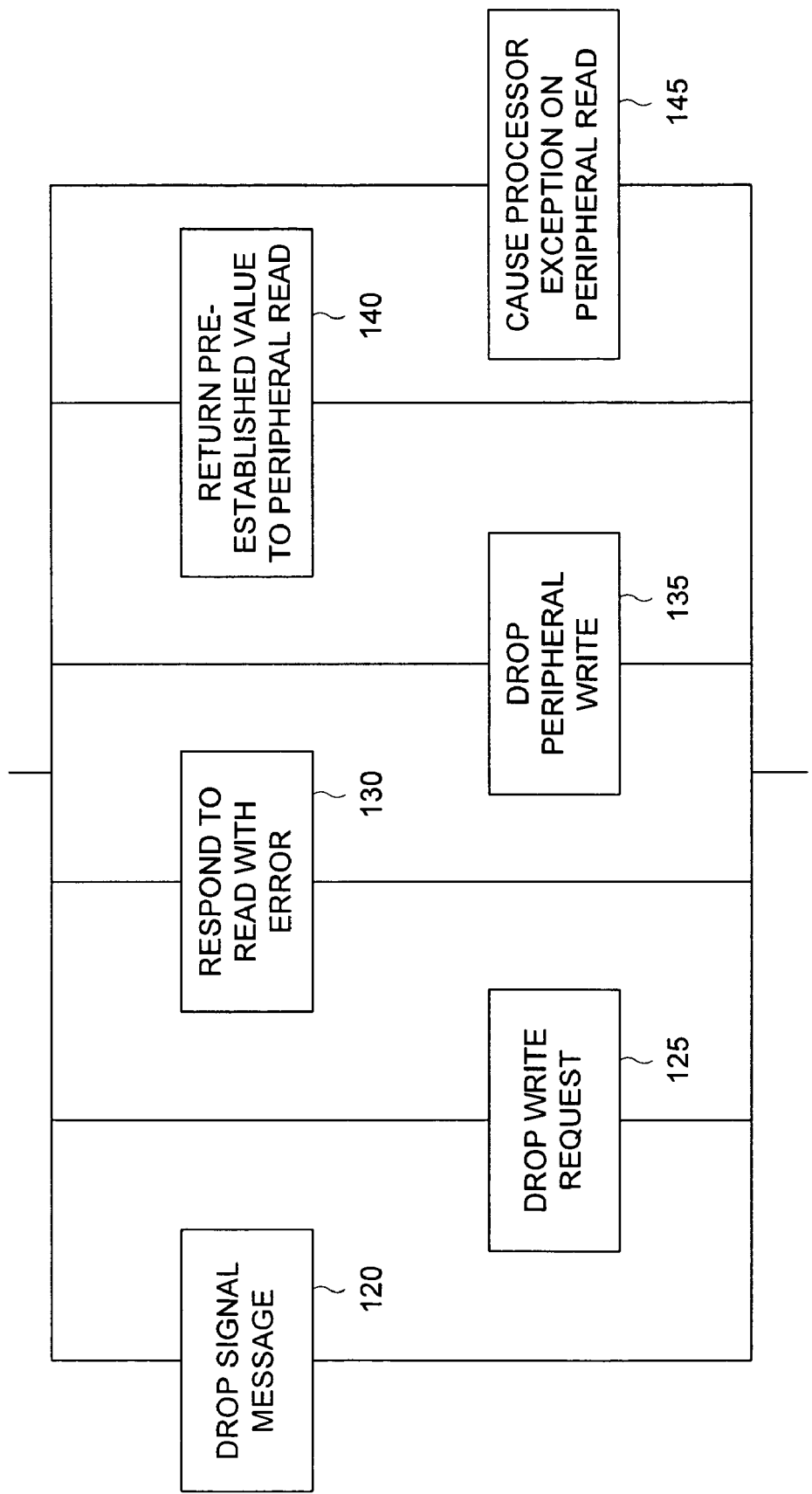
FIG. 9 is a flow diagram that depicts alternative example methods for containing a direct memory access device.

FIG. 9 is a flow diagram that depicts alternative example methods for containing a direct memory access unit. It should be appreciated that a wide variety of responses can be applied when a direct memory access unit violates the memory protection schema. Accordingly, the examples presented herein are intended to illustrate some illustrative variations of the present method and are not intended to limit the scope of the claims appended hereto.

According to one illustrative use case, a direct memory access unit may attempt to direct an interrupt message to a particular address included in a virtual address space. As such, one example variation of the present method provides for dropping an interrupt message (step 120) when such an interrupt message is detected and is addressed to a particular virtual address space in violation of a selected memory protection schema. It should be appreciated that an interrupt message is typically used by a peripheral unit as a means to inform another apparatus, for example a processor, that a particular operation has been completed. Interrupt messages (a.k.a. "signal messages") of this type are typically used in lieu of direct interrupt connections. It should also be appreciated that when a peripheral unit, such as a direct memory access unit, issues a single interrupt message to a particular location in memory, and that signal message is a violation of a selected memory access protection schema, it may be advantageous at a system-level simply to ignore the interrupt message. Any other response may cause other undesirable system-level complications, for example a system might become overwhelmed attempting to service interrupts if they are generated at a high rate by a misbehaving or maliciously programmed direct memory access device.

According to another illustrative use case, a direct memory access unit may attempt to write data into a particular virtual address space. Accordingly, yet another example variation of the present method provides for dropping a write request (step 125) when such a write request is directed to a virtual address based in violation of a determined memory protection schema. It should be appreciated that when a direct memory access unit attempts to write to a particular location in a virtual address space, dropping a write request may be the most suitable response. Otherwise, information in a particular virtual address space may be corrupted to the detriment of other processes executing in either a virtual environment or in the real computing environment that is hosting the virtual environment.

In yet another illustrative use case, a direct memory access unit may attempt to read from a location in violation of a memory protection schema. In this situation, one example variation of the present method provides for responding to a read request with an error (step 130). In this situation, it can be appreciated that when a direct memory access unit attempts to read information from a memory location within a particular virtual address space, it is necessary to inform the direct memory access unit that an error has occurred. Otherwise, the direct memory access unit would be allowed to continue and would be completely unaware of any fault that it may have experienced.

In some situations, a direct memory access unit may attempt to write to a peripheral device included in a virtual address space. When such a peripheral write request is detected and such peripheral write request is in violation of a determined memory protection schema, this alternative example variation of the present method provides for dropping the peripheral write request (step 135). As is the case with any write request to a location included in a virtual address space, one appropriate response is simply to ignore the write request. In the case where the write request is non-spurious, a device that is in violation of a memory protection schema is likely to exhibit additional anomalous behavior. In such cases, this subsequent anomalous behavior can be used to evoke a corrective action.

According to yet another illustrative use case, a direct memory access unit may attempt to read from a peripheral device included in a virtual address space. In this situation, one variation of the present method provides for responding to the peripheral read request with a pre-established value (step 140). By responding to a peripheral read request with a pre-establish value, a direct memory access unit can be informed of an error by responding to a peripheral read with an unexpected or illegal value. According to yet another variation of the present method, a processor exception (step 145) is caused when a peripheral read from a direct memory access unit is determined to be in violation of a determined memory protection scheme. In this situation, an exception is forced causing a processor to respond to rouge activity exhibited by a direct memory access unit which has been granted access to a virtual address space.

Figure 10:
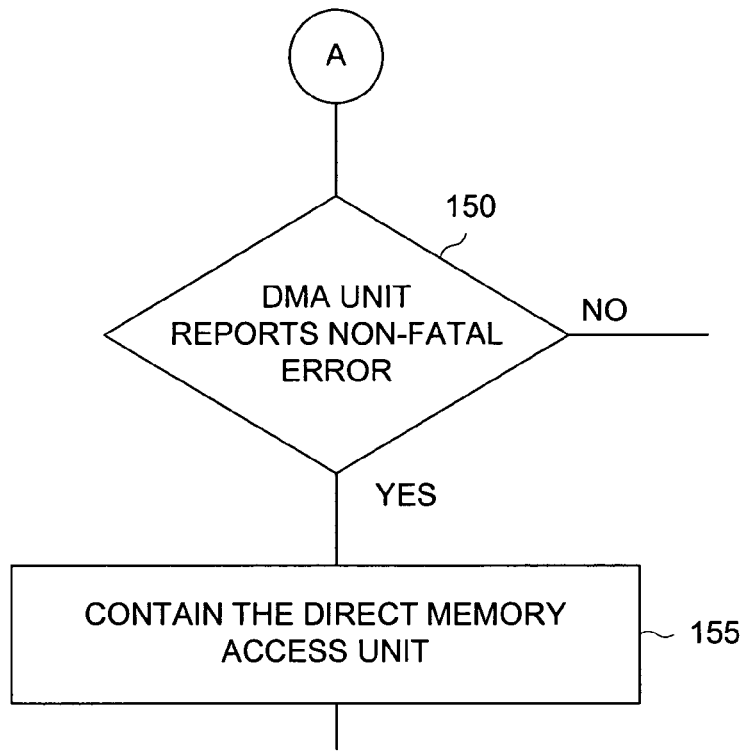
FIG. 10 is a flow diagram that depicts an alternative method for responding to a non-fatal error exhibited by a direct memory access device.

FIG. 10 is a flow diagram that depicts an alternative method for responding to a non-fatal error exhibited by a direct memory access unit. It should be appreciated that, according to one illustrative use case, a direct memory access unit that has been granted access to a virtual address space may itself determine that an error has occurred. In this situation, a direct memory access unit will typically report a non-fatal error. When a non-fatal error is recognized (step 150), the direct memory access unit is contained (step 155). It should be appreciated that the direct memory access unit is contained in a manner consistent with the teachings herein described.

Figure 11:
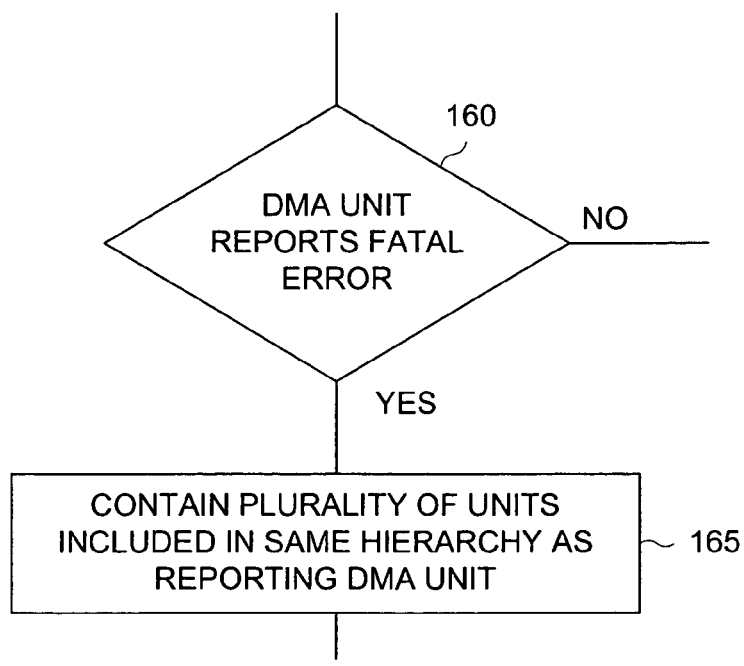
FIG. 11 is a flow diagram that depicts an alternative method for responding to a fatal error exhibited by a direct memory access device.

FIG. 11 is a flow diagram that depicts an alternative method for responding to a fatal error exhibited by a direct memory access unit. It should be appreciated that, according to one illustrative use case, a direct memory access unit that has been granted access to a memory may report a fatal error condition. In this situation, it is likely that an entire hierarchy has been subjected to an anomalous condition. Accordingly, this variation of the present method provides for containing a plurality of devices included in a hierarchy that is associated with a direct memory access unit (step 165) reporting a fatal error. Such containment, accordingly, is accomplished when a direct memory access unit reports a fatal error (step 160). One example of a hierarchy is that of all physical devices attached to a particular peripheral bus. As such, all of the functions on each physical device attached to the bus would be contained.

Figure 11A:
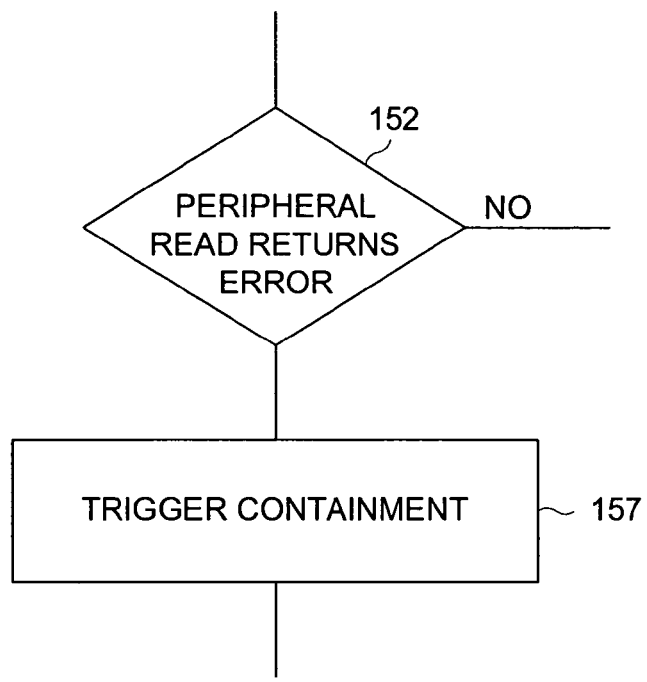

FIG. 11A is a flow diagram that depicts one method where containment is triggered upon a peripheral read error condition. In one example variation of the present method, when a peripheral read returns an error (step 152), the direct memory access unit is also contained (step 157). For example, when a processor attempts to read data from a direct memory access unit in a peripheral mode or when a direct memory access unit attempts to perform a peripheral read from a second direct memory access unit, the direct memory access unit is contained when such attempts result in an error condition.

Figure 11B:
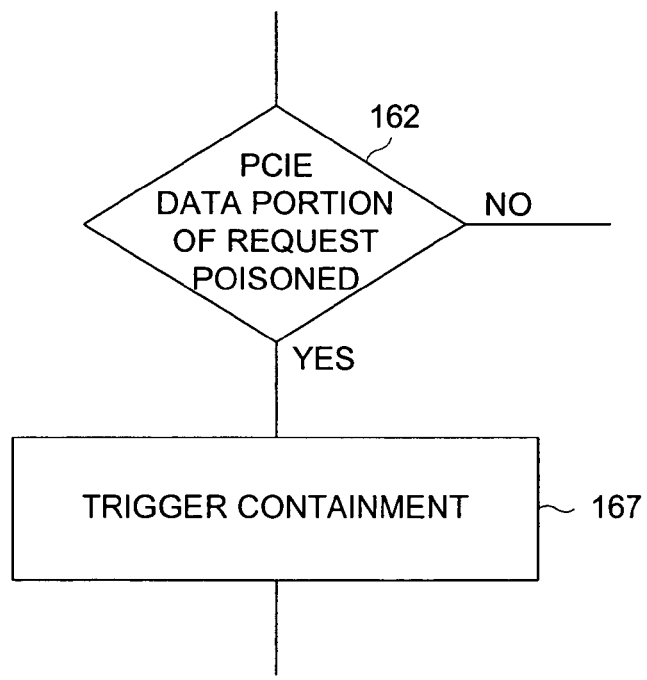

FIG. 11B is a flow diagram that depicts one method where containment is triggered as a result of a poisoned data portion of a request received by means of a Peripheral Component Interconnect express (PCIE) peripheral bus. In this case, a direct memory access unit that is the source of the request is contained (step 167) when the data portion of the request is poisoned (step 162).

Figure 12:
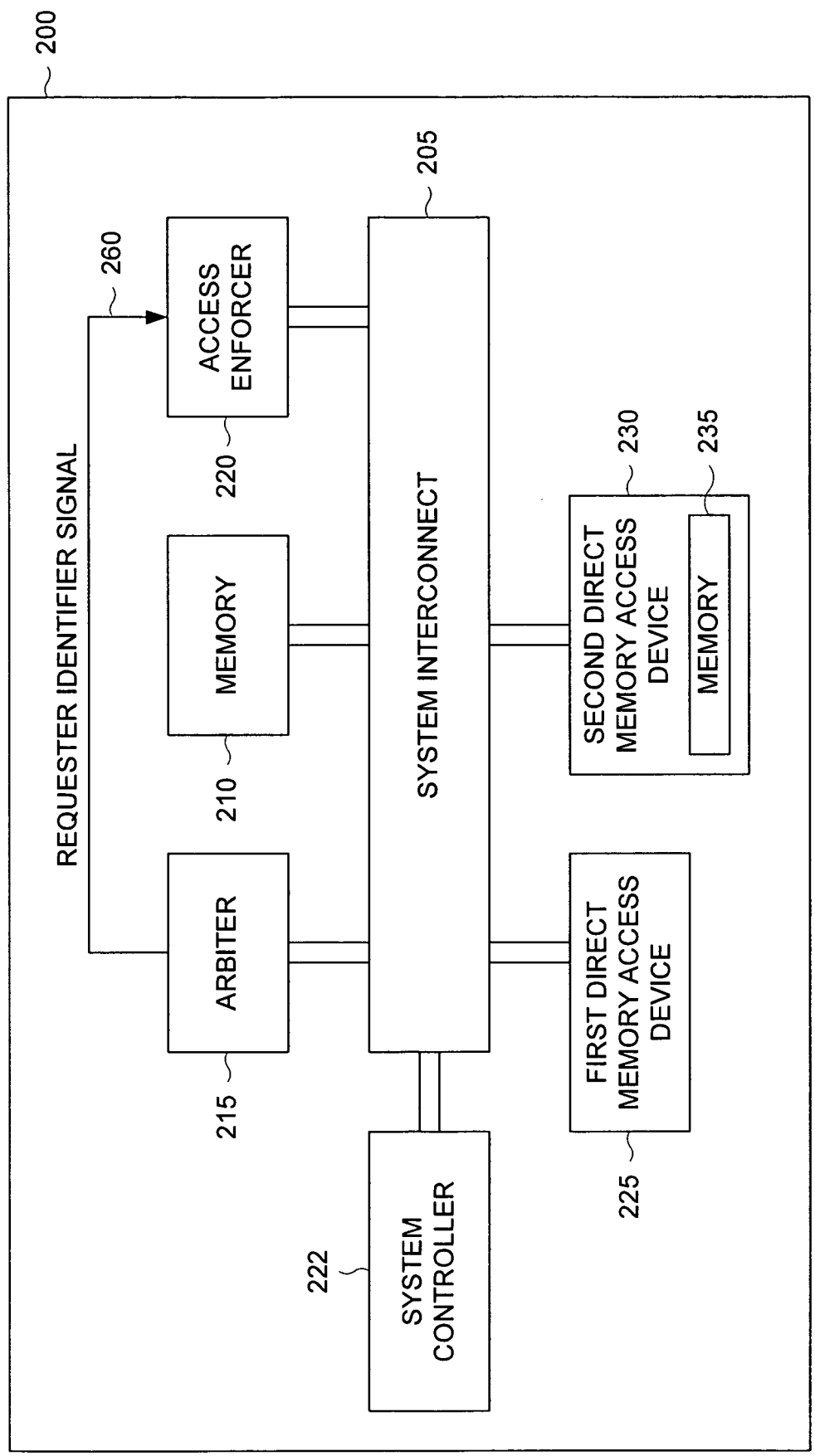
FIG. 12 is a block diagram that depicts several example embodiments of a system for providing direct access memory by a direct memory access device.

FIG. 12 is a block diagram that depicts several example embodiments of a system for providing a direct memory access unit access to a virtual address space. According to this one example embodiment, a system for providing a direct memory access unit access to a virtual address space comprises a memory 210, a first direct memory access unit 225, a system interconnect 205, an arbiter 215 and an access enforcer 220. According to one alternative example embodiment, the memory comprises a system memory 210. According to yet another alternative example embodiment, the memory comprises a peripheral memory 235. It should be appreciated that a peripheral memory 235, according to one illustrative use case, is included in a peripheral attached to the system interconnect 205. One example of a peripheral that includes a peripheral memory 235 is a second direct memory access unit 230. It should also be appreciated that, according to one alternative example embodiment, the system interconnect 205 comprises a Peripheral Component Interconnect bus. In yet another example embodiment, the system interconnect 205 comprises a Peripheral Component Interconnect express bus. It should be appreciated that these example alternative embodiments of a system interconnect are presented herein for illustration purposes only and are not intended to limit the scope of the claims appended hereto.

In operation, the memory (210 or 235) is capable of storing information. The first direct memory access unit 225 is capable of interacting with the memory (210 or 235). The system interconnect 205 enables the first direct memory access unit 225 to interact with the memory (e.g. a system memory 210 or a peripheral memory 235). In order to gain access to the memory, the first direct memory access unit 225 directs a request to the arbiter 215. In response, the arbiter 215 determines whether or not the memory is available. In the event that the memory is available, the arbiter 215 determines a requester identifier for the first direct memory access unit 225. Based on the requester identifier determined for the first direct memory access unit 225, the arbiter 215 generates a requester identifier signal 260. The access enforcer 220 receives the requester identifier signal 260 and selects an access protection schema according to the requester identifier signal 260. Once the access enforcer 220 selects an access protection schema, the access enforcer enforces the selected access protection schema during a data transfer transaction occurring in the system interconnect 205.

Figure 13:
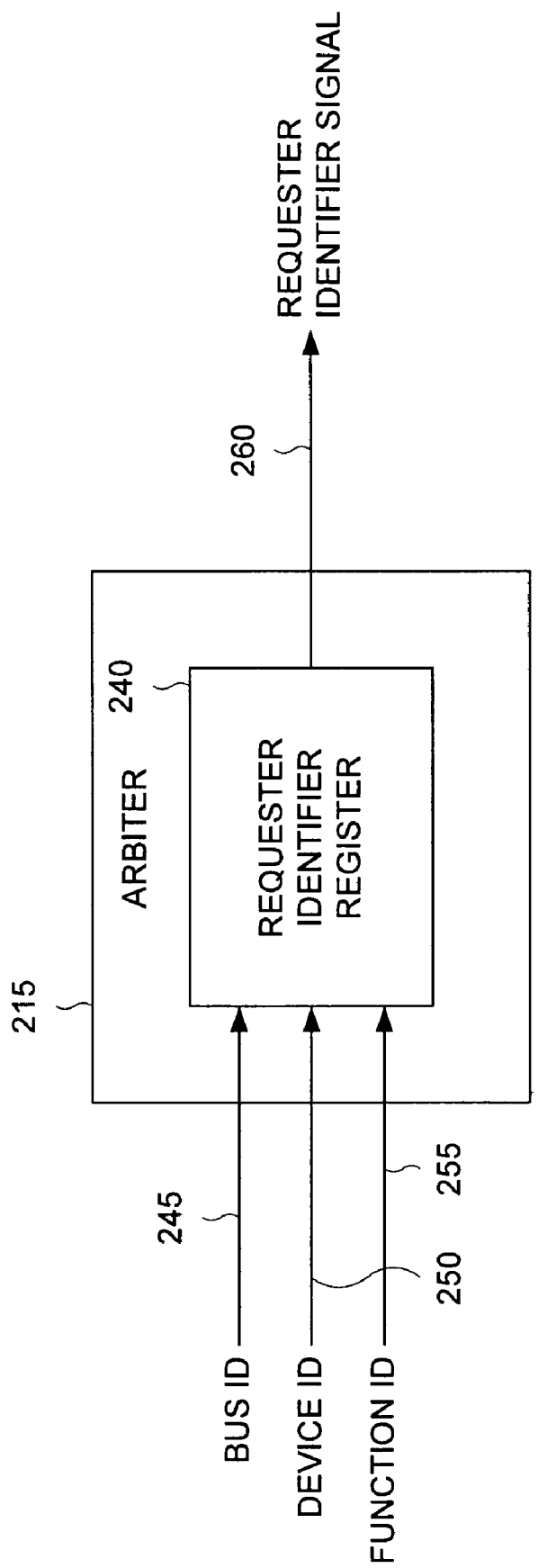
FIG. 13 is a block diagram that depicts one example alternative embodiment of an arbiter.

FIG. 13 is a block diagram depicts one example alternative embodiment of an arbiter. According to this example alternative embodiment, an arbiter 215 includes a requester identifier register 240. The requester identifier register 240, according to this alternative example embodiment, receives at least one of a bus identifier 245, a device identifier 250 and a function identifier 255. It should be appreciated that a bus identifier 245 is typically received from a first memory access device 225 that is requesting access to a virtual address space (a.k.a. a "requester"). It should also be appreciated that, according to one illustrative use case, a direct memory access unit determines a bus identifier (identifying to which bus it is attached) according to information provided to that direct memory access unit by the system interconnect 205. Typically, a system interconnect 205 provides a bus identification signal to each peripheral attached thereto. These bus identification signal enables a device attached to the system interconnect 205 to determine which bus it is attached to in a system that includes a plurality of system interconnects.

According to one illustrative use case, each physical device attached to the system interconnect 205 is distinguished from other physical devices attached to the same system interconnect 205 by means of a device identifier. The device identifier is typically seeded into the device by the system controller 222 when the controller recognizes that the device has been attached to a particular system interconnect. According to yet another illustrative use case, the requester identifier comprises a function identifier. A function identifier is also typically seeded by the system controller 222 into a particular function included in a physical device attached to the system interconnect 205. It should be appreciated that the requester identifier register 240 further includes a translation mechanism that converts at least one of a bus identifier 245, a device identifier 250 and a function identifier 255 into a requester identifier signal 260.

Figure 14:
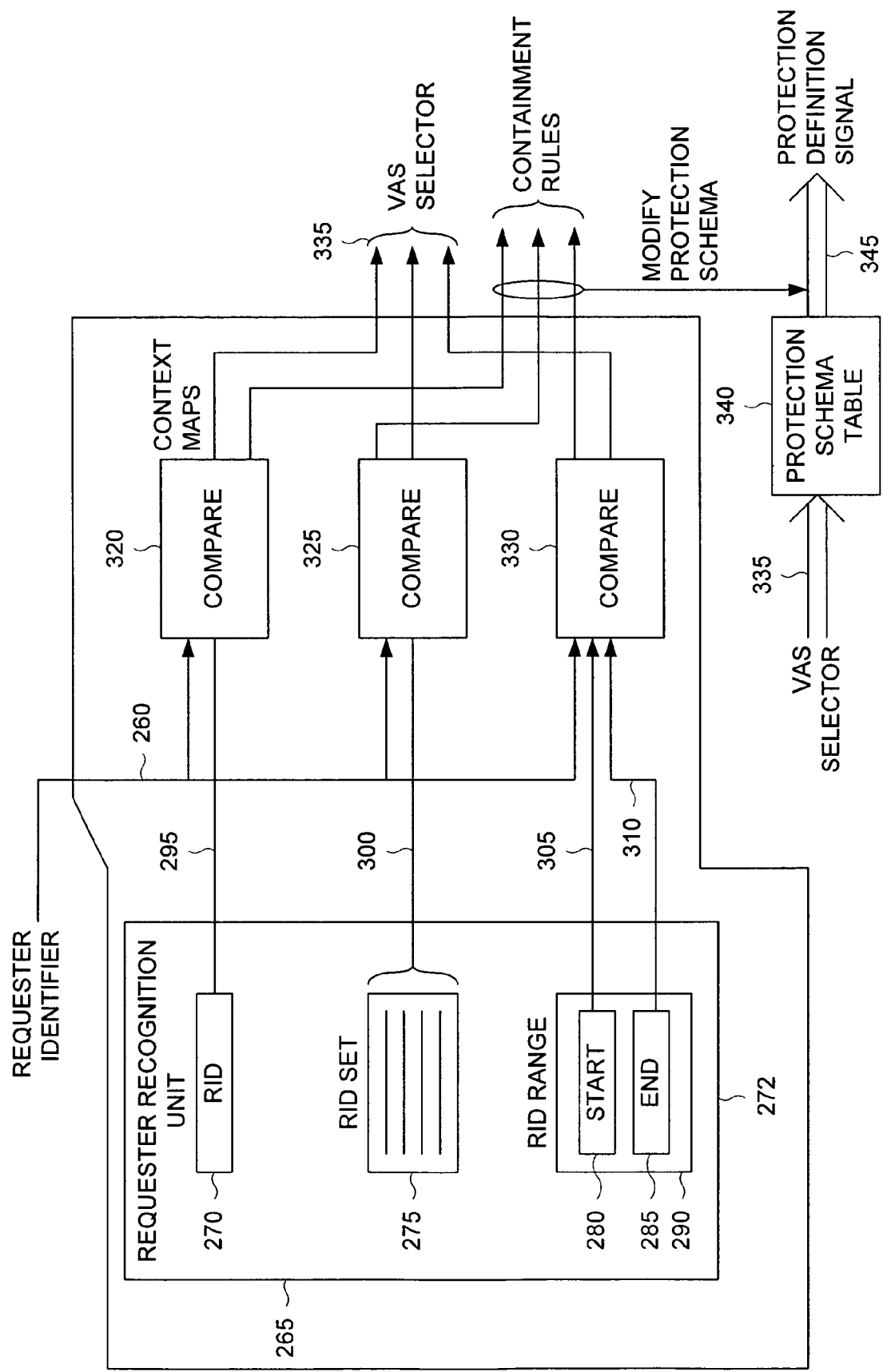
FIG. 14 is a block diagram that depicts several example alternative embodiments of an access enforcer.

FIG. 14 is a block diagram that depicts several example alternative embodiments of an access enforcer. It should be appreciated that, according to one alternative example embodiment, an access enforcer 220 comprises a requester recognition unit 265. The requester recognition unit 265 of one alternative example embodiment includes a requester identifier register 270. The requester identifier register 270 is used to store a single requester identifier. In operation, the single requester identifier is presented 295 to a comparator 320 included in this example embodiment of an access enforcer 220. The comparator 320 also includes a virtual address space table, which generates a virtual address space selection signal 335 according to the requester identifier presented to the comparator 320 once a successful comparison occurs between the single requester identifier 295 provided by the requester identifier register 270 and a requester identifier represented by the requester identifier signal 260 received from the arbiter 215.

According to yet another alternative example embodiment, the requester recognition unit 265 includes a requester identifier match set 275. The match set 275 includes one or more registers, each capable of storing a requester identifier. The one or more requester identifiers stored in the registers included in the match set 275 are provided 300 to a comparator 325 included in this alternative example embodiment of the access enforcer 220. The comparator 325 then compares a value represented by the requester identifier signal 260 received from the arbiter 215 to the one or more requester identifiers 300 received from the requester identifier match set 275. When a successful comparison occurs, the comparator 325, which also includes a virtual address space table, generates a virtual address based selector signal 335 according to the requester identifier signal 260 received from the arbiter 215.

According to yet another alternative example embodiment, the requester recognition unit 265 includes a requester identifier range set 290. The requester identifier range set 290, according to this alternative example embodiment, includes a start register 280 and an end register 285. In operation, the start register 280 provides a start value 305 and an end value 310 is provided by the end register 285. The start value 305 and the end of value 310 are directed to a comparator 330 included in this alternative example embodiment of the access enforcer 220. According to this alternative example embodiment, the comparator 330 compares a value represented by a requester identifier signal 260 received from the arbiter 215 to the start value 305 and the end value 310, which are received from the requester identifier ranges set 290. When the comparator discovers that the value represented by a received requester identifier signal 260 lies within a range specified by the start value 305 and the end value 310, the comparator 330, which also includes a virtual address space table, generates a virtual address space selector 335. It should be appreciated that the virtual address space selector 335 is generated according to the requester identifier signal 260 received from the arbiter 215.

Figure 15:
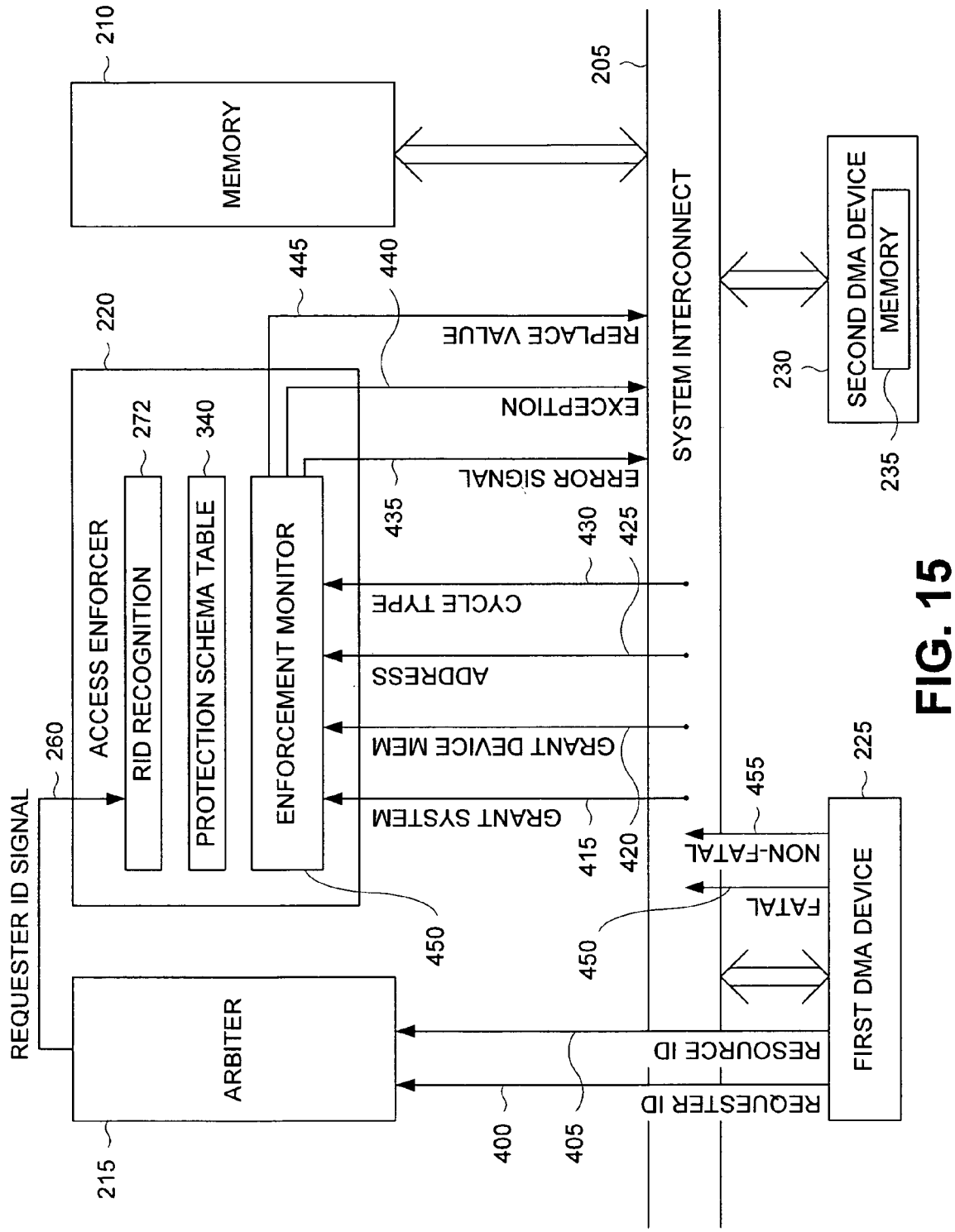
FIG. 15 is a block diagram that depicts detailed operational characteristics of a system for providing a direct memory access unit access to a virtual address space.

FIG. 15 is a block diagram that depicts detailed operational characteristics of one illustrative system for providing a direct memory access unit access to a virtual address space. It should be appreciated that, according to one alternative example embodiment, the arbiter 215 receives a requester identifier 400 from a first direct memory access (DMA) unit 225. It should also be appreciated that a first direct memory access unit 225, according to one illustrative use case, may not be interested in accessing a system memory 210. Accordingly, the arbiter 215 must determine which memory resource the first direct memory access unit 225 is attempting to access. As such, one alternative example embodiment of an arbiter 215 receives a resource identifier 405 from the first direct memory access unit 225. It should be appreciated that the resource identifier 405 is typically received in association with a request for access to memory commensurate with the teachings provided herein.

FIG. 12 further illustrates that, according to one illustrative example embodiment, the system for providing a direct memory access unit with direct access to a virtual address space further comprises a system controller 222. According to this alternative example embodiment, the system controller 222 uses the system interconnect 205 to store a memory protection schema in the access enforcer 220. The system controller 222 of one alternative example embodiment also uses the system interconnect 205 to assign a requester identifier to the first direct memory access unit 225. It should be appreciated that the memory protection schema stored in the access enforcer is stored in association with the requester identifier assigned to the first direct memory access unit 225.

According to yet another alternative illustrative embodiment, the system controller 222 assigns a second requester identifier to a second direct memory access unit 230. It should be appreciated that, according to this alternative example embodiment, the system controller 222 programs the access enforcer 220 to associate the memory protection schema stored in association with the first requester identifier and in association with the second requester identifier. As such, both the first direct memory access unit 225 and a second direct memory access unit 230 will be associated with a common memory protection schema.

According to yet another alternative example embodiment, the system controller 222 assigns a second requester identifier to the second direct memory access unit 230. According to this alternative example embodiment, the system controller 222 stores a second memory protection schema in the access enforcer 220. In this situation, the second protection schema is stored in association with the second requester identifier. According to one illustrative use case, the system controller 222 programs the access enforcer 220 so as to enable a second direct memory access unit 230 to be associated with a second memory protection schema. It should be appreciated that, according to this illustrative use case, the system controller 222 also programs the access enforcer 220 to associate the first memory protection schema with a first requester identifier, which is associated with the first direct memory access unit 225.

FIG. 15 also illustrates that, according to one alternative example embodiment, the access enforcer 220 contains the first direct memory access unit 225 when a memory protection schema has been violated. According to one alternative example embodiment, the access enforcer 220 receives at least one of a cycle type indicator 430 and an access address 425 from the system interconnect 235. In one alternative example embodiment, the access enforcer 220 determines that a first direct memory access unit 225 is attempting to issue a signal message by examining the value presented in the cycle type of signal 430 received from the system interconnect 205. According to this alternative example embodiment, the access enforcer 220 contains the first direct memory access unit 225 by preventing the completion of a transaction. In one alternative example embodiment, the access enforcer 220 directs an error signal 435 back to the system interconnect 205, thereby preventing the completion of the signal message.

According to yet another alternative example embodiment, the access enforcer 220 contains a direct memory access unit 225 by forcing a transaction error when a read request is detected. Accordingly, the access enforcer 220 determines that a read request is pending on the system interconnect 205 by examining the value presented in the cycle type signal 430. When a read request is detected in this manner, the access enforcer 220 directs an error signal 435 back to the system interconnect 205.

In yet another example alternative embodiment, the access enforcer 220 contains a direct memory access unit 225 by preventing the completion of a peripheral write request. It should be appreciated that the access enforcer 220 of this alternative example embodiment determines when a peripheral write request is carried by the system interconnected 205 by examining the state of the cycle type signal 430 received from the system interconnect. According to one alternative example embodiment, the access enforcer 220 prevents the completion of a peripheral write request by the directing an error signal 435 back to the system interconnect 205.

According to yet another alternative example embodiment, the access enforcer 220 contains the first direct memory access unit 225 by replacing a response value when peripheral read request is detected. In this situation, the access enforcer 220 detects a peripheral read by sensing the state of the cycle type signal 430 received from the system interconnect 205. When a peripheral read is detected in this manner, the access enforcer 220 directs a replacement value 445 back to the system interconnect 205. According to yet another alternative example embodiment, the access enforcer 220 generates a processor exception 440 thereby directing a processor exception 440 back to the system interconnect 205 when a peripheral read request is detected.

FIG. 15 further illustrates that, according to one alternative example embodiment, a first direct memory access unit 225 is capable of issuing at least one of a fatal error signal 450 and a non-fatal error signal 455. It should be appreciated that the first direct memory access unit 225 is typically capable of determining when it has experienced an unexpected form of operation. In some cases, the unexpected operation is determined to be of localized scope. Accordingly, the first direct memory access unit 225, in this case, issues a non-fatal error signal 455 to the system interconnect 205. In one alternative embodiment, the system interconnect 470 comprises a Peripheral Component Interconnect express bus and the first direct memory access unit 225 is contained when the system interconnect reports that a data portion of a transfer request is poisoned.

Figure 16:
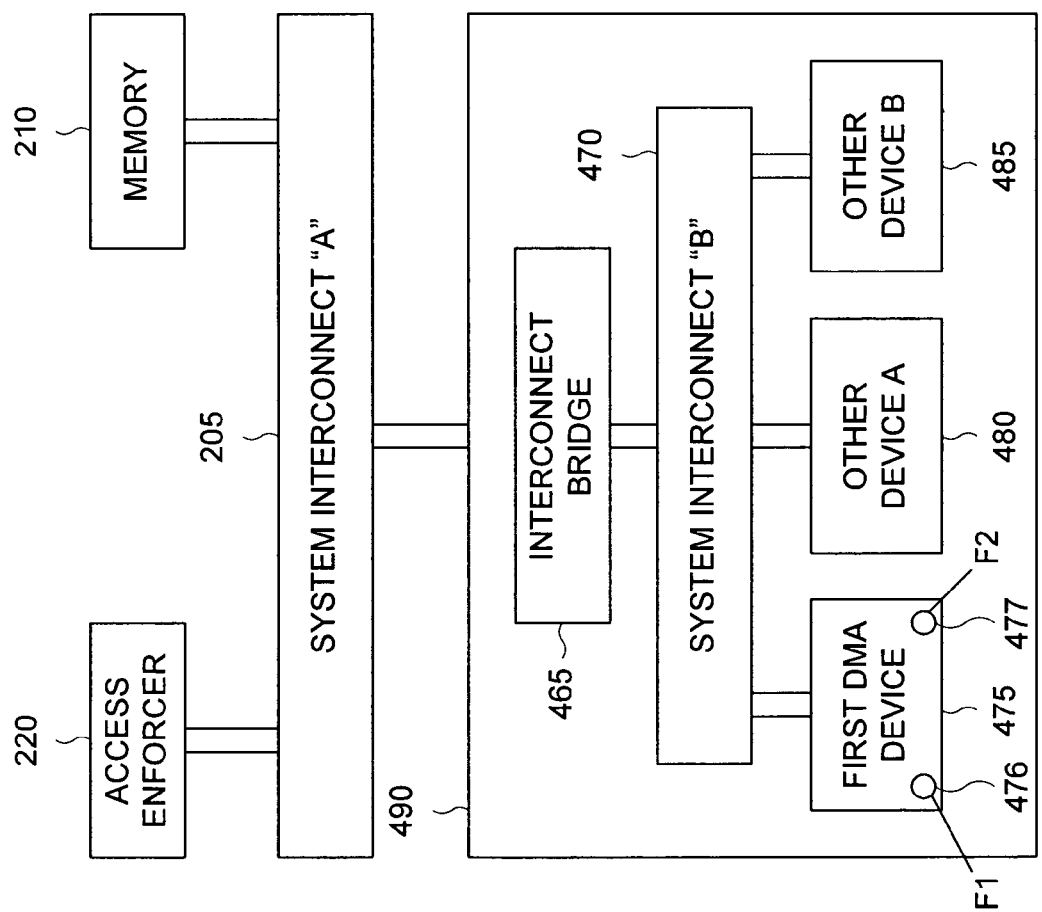
FIG. 16 is a block diagram that depicts a hierarchical system structure wherein a direct memory access unit is allowed access to a virtual address space.

FIG. 16 is a block diagram that depicts a hierarchical system structure wherein a direct memory access unit is allowed access to a virtual address space. According to this example embodiment, a first direct memory access unit 475 is included in a hierarchy 490 that is attached to a first system interconnect 205 by means of an interconnect bridge 465. According to one alternative example embodiment, the interconnect bridge 465 enables communications between the first system interconnect 205 and a second system interconnect 470, which is also included in this alternative example embodiment. The first direct memory access unit 475 is thereby attached to the second system interconnect 470. According to one illustrative use case, other devices (480, 485) are also attached to the second system interconnect 470. The first direct memory access unit 475 and other devices (480, 485) which are communicatively associative with each other by means of the second system interconnect 470 collectively form a hierarchy 490 within a computing environment.

As already discussed, a first direct memory access unit 475 can, while operating, determine that it has experienced an anomalous condition. In a situation where the first direct memory access unit 475 determines that a particular anomalous conditioned cannot be localized within the first direct memory access unit 475 itself, the first direct memory access unit 475 will report a fatal error. According to this example embodiment, the fatal error is propagated back to the access enforcer 220, which then contains the hierarchy 490 that includes the first direct memory access unit 475. According to one alternative example embodiment, the access enforcer 220 causes the system interconnects 205 to discontinue operation across the interconnect bridge 465 in order to contain the hierarchy 490 in which the first direct memory access unit 475 is included. It should be appreciated that, once the interconnect bridge 465 is disabled, any unit attached to the second interconnect 470 will be contained, including, for example, a second interconnect bridge that is used to bridge over from the second system interconnect 470 to a third system interconnect and so forth.

Figure 17:
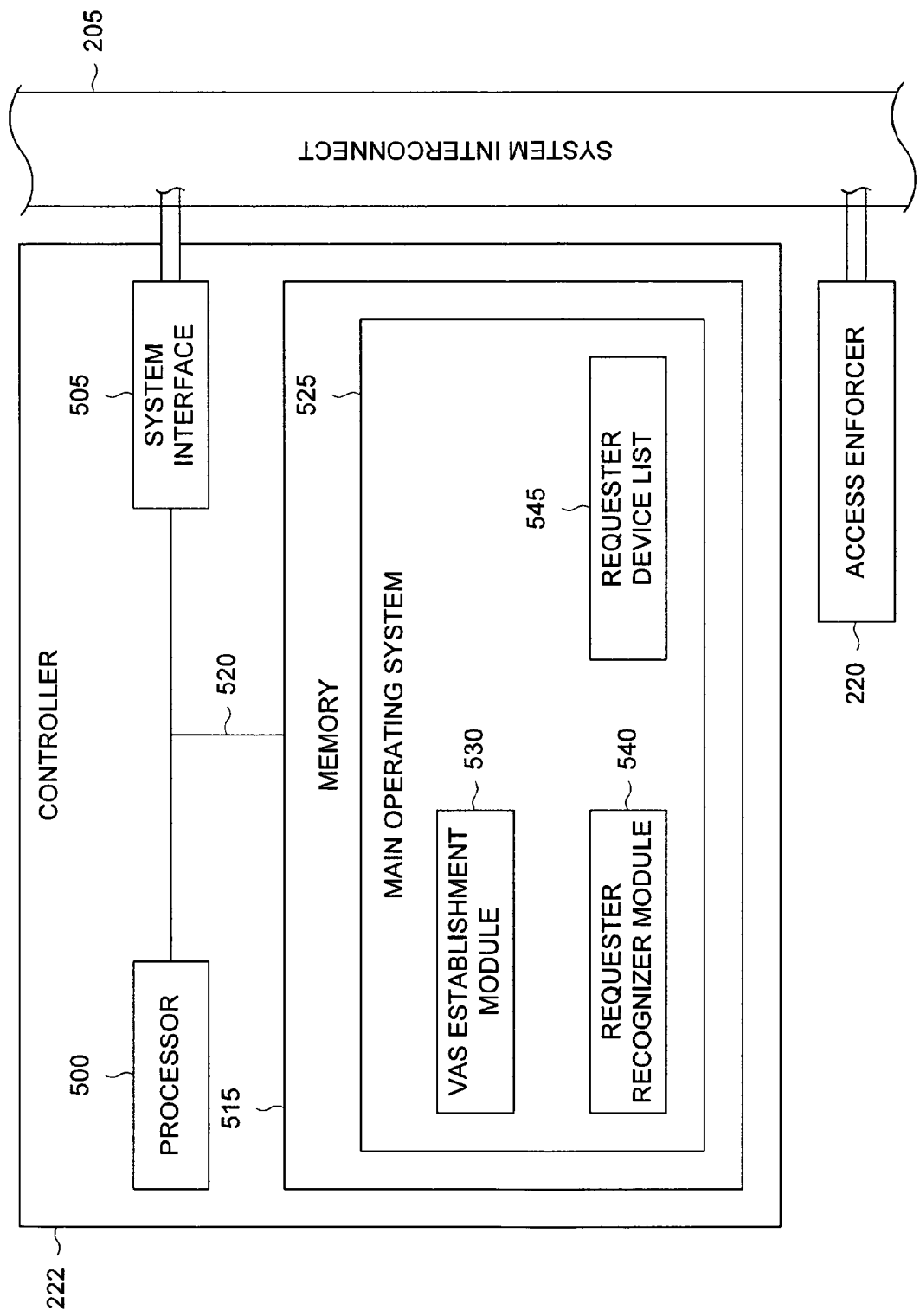
FIG. 17 is a block diagram of one example embodiment of a system that facilitates a direct memory access controller to gain access to a virtual address space.

FIG. 17 is a block diagram of one example embodiment of a system that facilitates a direct memory access controller to gain access to a virtual address space. According to this example embodiment, a system includes an access enforcer 220 and a controller 222 that comprises a processor 500, a system interface 505 and a memory 515. In this example embodiment, the processor 500, the system interface 505 and the memory 515 are communicatively associated with each other by means of a bus 520. It should be appreciated that, in operation, the system interface 505 enables the processor 500 to communicate with a system interconnect 205, which is also included in this example embodiment of a system that facilitates a direct memory access unit to gain access to a virtual address space.

Also included in various example alternative embodiments of the system are one or more functional modules. A functional module is typically embodied as an instruction sequence. An instruction sequence that implements a functional module, according to one alternative embodiment, is stored in the memory 515. The reader is advised that the term "minimally causes the processor" and variants thereof is intended to serve as an open-ended enumeration of functions performed by the processor 500 as it executes a particular functional module (i.e. instruction sequence). As such, an embodiment where a particular functional module causes the processor 500 to perform functions in addition to those defined in the appended claims is to be included in the scope of the claims appended hereto.

The functional modules (i.e. their corresponding instruction sequences) described thus far that enable management of a direct memory access unit according to the present method are, according to one alternative embodiment, imparted onto computer readable medium. Examples of such medium include, but are not limited to, random access memory, read-only memory (ROM), compact disk ROM (CD ROM), floppy disks, hard disk drives, magnetic tape and digital versatile disks (DVD). Such computer readable medium, which alone or in combination can constitute a stand-alone product, can be used to convert a general-purpose computing platform into a device capable of allowing a direct memory access unit to access a virtual address space according to the techniques and teachings presented herein. Accordingly, the claims appended hereto are to include such computer readable medium imparted with such instruction sequences that enable execution of the present method and all of the teachings herein described.

According to one alternative example embodiment, the memory 515 is used to store a main operating system 525. According to one alternative embodiment, the main operating system 525 includes a virtual address space (VAS) establishment module 530. According to yet another alternative example embodiment, the main operating system 525 includes a requester recognizer module 540.

Figure 18:
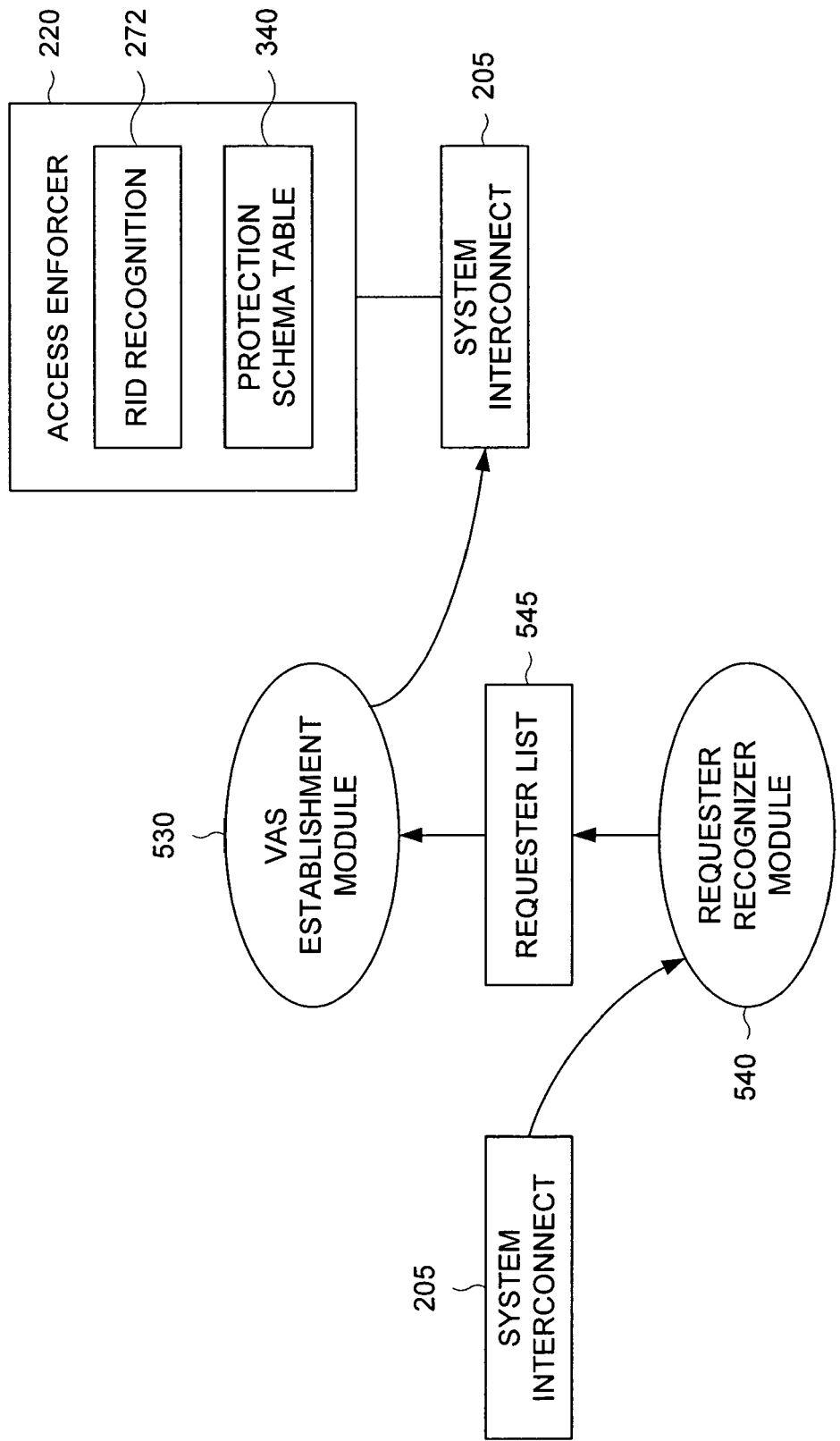
FIG. 18 is a dataflow diagram that depicts the internal operation of several alternative example embodiments of a system that allows a direct memory access unit to access a virtual address space.

FIG. 18 is a dataflow diagram that depicts the internal operation of several alternative example embodiments of a system that allows a direct memory access unit to access a virtual address space. According to one example alternative embodiment, the main operating system 525 is included in the memory 515 and is executed by the processor 500. When executed by the processor, the main operating system minimally causes the processor 500 to identify a direct memory access unit attached to the system interconnect 205. Once a direct memory access unit is identified, the main operating system 525 further minimally causes the processor 500 to associate the identified direct memory access unit with a virtual address space. Accordingly, a memory protection schema is directed to the access enforcer 220. It should be appreciated that the memory protection schema that is directed to the access enforcer 220 is associated with a particular virtual address space. It should likewise be appreciated that the virtual address space is associated with a particular device attached to the system interconnect 205, as heretofore described.

In one alternative example embodiment, the main operating system 515 includes a requester recognizer module 540. The requester recognizer model 540, when executed by the processor 500, minimally causes the processor to identify a particular requester attached to the system interconnect 205. Typically, the requester recognizer model 540 minimally causes processor to recognize a direct memory access device. According to one alternative example embodiment, the requester recognizer module 540 minimally causes the processor 500 to recognize a requester attached the system interconnect 205 by minimally causing the processor to receive a bus location identifier from a direct memory access unit attached to the system interconnect 205. According to yet another example alternative embodiment, the requester recognizer module 540 causes the processor 500 to recognize a device attached the system interconnect 205 by minimally causes processor 500 to receive a device type identifier from a direct memory access unit attached the system interconnect 205. Yet another example alternative embodiment, the requester recognizer module 540 causes the processor 500 to recognize a device attached to the system interconnect 205 by minimally causes processor 500 to receive a device function identifier from a direct memory access unit attached the system interconnect 205. It should be appreciated that requester recognizer module 540 further minimally causes processor 500 to store an identifier for a recognized device in a requester list 545, which is maintained in the memory 515.

According to yet another alternative example embodiment, the processor 500 executes the virtual address space (VAS) establishment module 530. The virtual address space establishment module 530 minimally causes the processor to retrieve a requester identifier from a requester list 545 maintained in the memory 515. Based on the requester identifier, the virtual address space establishment module 530 causes the processor to determine a particular virtual address space which should be associated with a requester identifier retrieved from a requester list 545. In yet another alternative example embodiment, the virtual address space establishment module 530 further minimally causes the processor 500 to direct a memory protection schema for the virtual address space to the access enforcer 220. Typically, the virtual address space establishment module 530 minimally causes the processor to direct the memory protection schema to a protection schema table 340 included in the access enforcer 220. It should be appreciated that the system interconnect 205 is used by the processor to enable the transfer of a memory protection schema to the protection schema table 340 included in the access enforcer 220.

According to yet another alternative example embodiment, the virtual address space establishment module 530 minimally causes the processor 500 to direct a memory protection schema to the access enforcer 220 along with a requester identifier. The requester identifier is stored in a requester identifier recognition unit 272 included in the access enforcer 220. According to one alternative example embodiment, a single device identifier is directed to the device identifier recognition unit 272. In yet another alternative example embodiment, a set of requester identifiers is directed to the requester identifier recognition unit 272. And in yet another alternative example embodiment, a range specifier is directed to the requester identifier recognition unit 272. It should be appreciated that the access enforcer 220 will associate a particular protection schema stored in a protection schema table 340 with a particular requester identifier stored in the requester identifier recognition unit 272, commensurate with the techniques and teachings presented herein.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method for allowing a direct memory access unit to access virtual address space comprising:
   receiving a request for memory access of the virtual address space from the direct memory access unit controlled by a guest operating system in a virtual machine environment;
   determining a requester identifier according to the received request for memory access;
   determining a memory protection schema according to the determined requester identifier; and
   granting the direct memory access unit access to a memory in the virtual address space in accordance with the determined memory protection schema.

2. The method of claim 1 wherein determining a requester identifier comprises determining at least one of a bus identifier, a device identifier and a function identifier.

3. The method of claim 1 wherein determining a memory protection schema comprises:
   identifying a memory protection schema that is associated with at least one of a single requester identifier, a set of requester identifiers and a range of requester identifiers; and
   selecting the identified memory protection schema as a determined memory protection schema.

4. The method of claim 1 wherein granting the direct memory access unit access to a memory comprises granting in accordance with the determined memory protection schema the direct memory access unit access to at least one of a system memory and a peripheral memory.

5. The method of claim 1 further comprising:
   assigning a requester identifier to the direct memory access device;
   associating the requester identifier with the virtual address space;
   establishing the memory protection schema for the virtual address space.

6. The method of claim 5 further comprising:
   assigning a second requester identifier to a second direct memory access unit; and
   associating the second requester identifier with the virtual address space.

7. The method of claim 5 further comprising:
assigning a second requester identifier to a second direct memory access unit;
associating the second requester identifier with a second virtual address space; and
establishing a second memory protection schema for the second virtual address space.

8. The method of claim 1 further comprising containing the direct memory access unit when the memory protection schema is violated.

9. The method of claim 8 wherein containing the direct memory access unit comprises at least one of dropping a signal message, dropping a write request, responding to a read request with an error, dropping a peripheral write request, responding to a peripheral read request with a pre-established value and causing a processor exception when a peripheral read request is recognized.

10. The method of claim 1 further comprising containing the direct memory access unit when the direct memory access unit reports a non-fatal error.

11. The method of claim 1 further comprising containing a plurality of functional units included within a hierarchy when the direct memory access unit reports a fatal error.

12. The method of claim 1 further comprising containing the direct memory access unit when a peripheral read returns an error.

13. The method of claim 1 further comprising containing the direct memory access unit when a data portion of a Peripheral Component Interconnect express request is poisoned.

14. A computing system for providing direct access to memory by a direct memory access unit comprising:
a virtual machine environment containing a guest operating system;
memory to store information, wherein the memory is in a virtual address space managed by the guest operating system in the virtual machine environment;
first direct memory access unit to interact with the memory, wherein the first memory access unit is controlled by the guest operating system;
system interconnect to communicatively associate the memory and the first direct memory access unit;
arbiter to receive a request for access to the memory from the first direct memory access unit and further to determine a requester identifier for the first direct memory access unit and generate a requester identifier signal according to the determined requester identifier; and
access enforcer to select an access protection schema according to the requester identifier signal and further to enforce the selected access protection schema during a data transfer transaction occurring in the system interconnect.

15. The system of claim 14 wherein the arbiter comprises a requester identifier register to receive at least one of a bus identifier, a device identifier and a function identifier for the first direct memory access unit.

16. The system of claim 14 wherein the access enforcer comprises:
requester recognition unit to generate a virtual address space signal by matching the requester identifier signal to at least one of a single requester identifier, a set of requester identifiers and a range requester identifiers; and
protection schema table that includes a plurality of protection schema records to store a plurality of memory protection schemas and further to generate a memory protection definition according to the contents of a selected protection schema record, wherein the protection schema record is selected according to the virtual address space signal.

17. The system of claim 14 wherein the arbiter is to receive a resource identifier in association with a request to access memory and wherein the memory comprises at least one of a system memory and a peripheral memory.

18. The system of claim 14 further comprising a system controller to assign a requester identifier to the first direct memory access unit and further to store a memory protection schema in the access enforcer in association with the assigned requester identifier.

19. The system of claim 18 wherein the system controller is further to assign a second requester identifier to a second direct memory access unit and further to associate the second requester identifier with the memory protection schema stored in association with the first requester identifier in the access enforcer.

20. The system of claim 18 wherein the system controller is further to assign a second requester identifier to a second direct memory access unit and further to score a second memory protection schema in the access enforcer in association with the second assigned requester identifier.

21. The system of claim 14 wherein the access enforcer contains the first direct memory access unit when a memory access schema is violated.

22. The system of claim 21 wherein the access enforcer contains the first direct memory access unit by at least one of preventing completion of a transaction when a signal message is detected, forcing a transaction error in when a read request is detected, preventing completion of a peripheral write request, replacing a response value when a peripheral read request is detected and directing an exception of a processor when a peripheral read request is detected.

23. The system of claim 14 wherein the access enforcer contains the fast direct memory access unit when the first direct memory access unit reports a non-fatal error.

24. The system of claim 14 wherein the access enforcer contains a plurality of functional units that belong to a hierarchy that also includes the first direct memory access unit when the first direct memory access unit reports a fatal error.

25. The system of claim 14 wherein the access enforcer contains the first direct memory access unit when a peripheral read returns an error.

26. The system of claim 14 wherein the system interconnect comprises a Peripheral Component Interconnect express bus and wherein the access enforcer contains the first direct memory access unit when the system interconnect reports a poisoned data portion in a request.

27. A system comprising:
processor to execute an instruction sequence;
memory to store one or more instruction sequences and further to store information;
system interconnect to communicatively associate the processor to the memory and at least one direct memory access unit;
access enforcer to receive a memory protection schema from the processor and further to enforce transactions occurring in the system interconnect in accordance with a received memory protection schema; and
one or more instruction sequences stored in the memory including:
a main operating system that, when executed by the processor, causes the processor to:
identify a direct memory access unit attached to the system interconnect;

associate the identified direct memory access unit with a virtual address space; and direct a memory protection schema for the virtual address space to the access enforcer;

the one or more instruction sequences stored in the memory further including a guest operating system, that when executed by the processor, manages the virtual address space and controls the direct memory access unit.

28. The system of claim 27 wherein the main operating system causes the processor to identify the direct access memory unit by causing the processor to execute a functional unit recognition module that, when executed by the processor, causes the processor to identify the direct memory access unit by receiving at least one of a bus identifier from the direct memory access unit, a device identifier from the direct memory access unit and a function identifier from the direct memory access unit.

29. The system of claim 27 wherein the main operating system causes the processor to associate the identified direct memory access unit with the virtual address space by causing the processor to execute a virtual address space establishment module that, when executed by the processor, causes the processor to direct a memory protection schema to the access controller and further causes the processor to direct the access controller to store the memory protection schema in association with at least one of a single requester identifier, a set of requester identifiers and a range of requester identifiers.

30. A computer readable storage medium having imparted thereon one or more instruction sequences for enabling a direct memory access unit to access a virtual memory including:

a main operating system that, when executed by a processor, causes the processor to:

identify a direct memory access unit attached to a system interconnect;

associate identified direct memory access unit with a virtual address space; and direct a memory protection schema for a virtual address space to an access enforcer; and a guest operating system that, when executed by the processor, manages the virtual address space and controls the direct memory access unit.

31. The computer readable medium of claim 30 wherein the main operating system causes the processor to identify the direct access memory unit by causing the processor to execute a direct memory access unit recognition module that, when executed by the processor, causes the processor to identify the direct memory access unit by receiving at least one of a bus identifier from the direct memory access unit, a device identifier from the direct memory access unit and a function identifier from the direct memory access unit.

32. The method of claim 1, wherein the virtual address space is associated with the virtual machine environment that is created by a main operating system, the method further comprising the guest operating system managing the virtual address space.

33. The method of claim 1, wherein receiving the request for memory access of the virtual address space from the direct memory access unit comprises receiving the request for memory access of the virtual address space from a direct memory access bus device that is attached to a bus of a computing system.

34. The computing system of claim 14, further comprising a main operating system to create the virtual machine environment.

35. The computing system of claim 14, wherein the first direct memory access unit is a bus device.

36. The system of claim 27, wherein the main operating system, when executed by the processor, creates a virtual machine environment in which the guest operating system operates.

37. The system of claim 27, wherein the direct memory access unit comprises a bus device.

38. The computer readable storage medium of claim 30, wherein the main operating system, when executed by the processor, creates a virtual machine environment in which the guest operating system operates.

39. The computer readable storage medium of claim 30, wherein the direct memory access unit comprises a bus device.

* * * * *

UNITED STATES PATENT AND TRADEMARK OFFICE
CERTIFICATE OF CORRECTION

PATENT NO. : 7,451,249 B2 Page 1 of 1
APPLICATION NO. : 11/378852
DATED : November 11, 2008
INVENTOR(S) : Joe P. Cowan et al.

It is certified that error appears in the above-identified patent and that said Letters Patent is hereby corrected as shown below:

In column 16, line 21, in Claim 20, delete "score" and insert -- store --, therefor.

In column 16, line 36, in Claim 23, delete "fast" and insert -- first --, therefor.

In column 17, line 39, in Claim 30, after "associate" insert -- the --.

Signed and Sealed this

Fourth Day of August, 2009

JOHN DOLL
*Acting Director of the United States Patent and Trademark Office*